(12) United States Patent
Kinder et al.

(10) Patent No.: US 6,303,703 B1
(45) Date of Patent: Oct. 16, 2001

(54) METHOD FOR MAKING MONOAMINES

(75) Inventors: James D. Kinder, Canfield; Larry J. Baldwin, Berea; James L. Dever, Medina; Kevin M. Sonby, Cleveland; Daniel P. Taylor, Chagrin Falls, all of OH (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/418,216

(22) Filed: Oct. 13, 1999

Related U.S. Application Data

(63) Continuation-in-part of application No. 09/290,994, filed on Apr. 15, 1999, now abandoned.

(51) Int. Cl.$^7$ ....................................... C08F 8/32
(52) U.S. Cl. ...................... 525/333.7; 525/378; 525/379; 525/380
(58) Field of Search ................................ 525/333.7, 379, 525/380, 378

(56) References Cited

U.S. PATENT DOCUMENTS

| | | | |
|---|---|---|---|
| 5,444,125 | * 8/1995 | Tomita et al. | 525/333.7 |
| 5,780,554 | * 7/1998 | Emert et al. | 525/333.7 |
| 5,810,894 | 9/1998 | Dever et al. | 44/412 |
| 5,879,420 | 3/1999 | Kropp et al. | 44/412 |

OTHER PUBLICATIONS

Kennedy et al., "New Telechelic Polymers and Sequential Copolymers by Polyfunctional Initiator–Transfer Agents (Inifers). XVIII. Epoxy and Aldehyde Telechelic Polyisobutylenes," Journal of Polymer Science, Polymer Chemistry Edition, vol. 20, pp. 2809–2817 (1982).

Percec et al., "New Telechelic Polymers and Sequential Copolymers by Polyfunctional Initiator–Transfer Agents (Inifers) 29, Synthesis of $\alpha$, $\omega$–Di(Amino)Polyisobutylenes," Polymer Bulletin 9, 27–32 (1983).

* cited by examiner

*Primary Examiner*—Bernard Lipman
(74) *Attorney, Agent, or Firm*—Rankin, Hill, Porter & Clark LLP

(57) ABSTRACT

The present invention provides a new and improved method of producing halogen-free oligomeric olefin monoamines which avoids the use of costly high-pressure and high-temperature equipment. In one embodiment the method comprises epoxidizing a specific class of oligomeric olefins to provide an epoxidized oligomeric olefin, converting the epoxidized oligomeric olefin to an aldehyde, converting the aldehyde to an oxime and then converting the oxime to an amine. Alternatively, the aldehyde may be formed directly from the oligomeric olefin. In an alternative embodiment, the method comprises converting the aldehyde to a formamide intermediate, and then using hydrolysis to convert the formamide to the oligomeric olefin monoamine. In another preferred embodiment the method includes converting an oligomeric olefin directly to an aldehyde, converting the aldehyde to an oxime and then reducing the oxime to provide the oligomeric olefin monoamine.

16 Claims, No Drawings

METHOD FOR MAKING MONOAMINES

RELATED APPLICATIONS

This application is a continuation-in-part of application Ser. No. 09/290,994 entitled "Method For Making Monoamines" filed Apr. 15, 1999 now abandoned.

FIELD OF INVENTION

The present invention concerns novel methods for making oligomeric olefin monoamines. More particularly, the present invention concerns novel methods for making a specific type of halogen-free oligomeric olefin monoamine for use as fuel additives.

BACKGROUND

Deposit control fuel additives are well-known in the prior art. Such additives serve to limit the formation of unwanted deposits in engine intake systems. U.S. Pat. No. 5,810,894 provides a halogen-free additive comprising an oligomeric olefin monoamine. Halogen-free additives are desirable because of today's concerns regarding the use of halogen containing compounds.

Unfortunately, the methods disclosed in U.S. Pat. No. 5,810,894 for producing oligomeric olefin monoamines require the use of high-pressures and elevated temperatures which in turn require expensive equipment and high cost facilities. The present invention, however, provides methods for producing a specific type of oligomeric olefin monoamine that do not require the use of high-pressures and elevated temperatures.

SUMMARY OF THE INVENTION

The present invention provides a new and improved method of producing halogen-free oligomeric olefin monoamines having an end group structure of

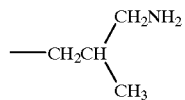

using temperatures of less than about 150° C. and pressures less than about 200 psi comprising epoxidizing a specific class of oligomeric olefins to provide an oligomeric olefin epoxide, and then converting the oligomeric olefin epoxide to an oligomeric olefin aldehyde. In one preferred embodiment the aldehyde is converted to an oxime followed by converting the oxime to a monoamine. Alternatively, the aldehyde may be formed directly from the oligomeric olefin, and then converted to an oxime, and finally to a monoamine. In an alternative embodiment, the method comprises converting the aldehyde to a formamide intermediate, and then using hydrolysis to convert the formamide to the monoamine. In yet another embodiment, the method comprises the conversion of the epoxide to the oxime and then the oxime is converted to the monoamine. All of these methods avoid the use of costly high-pressure and high-temperature reactions.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENT

The present invention provides novel methods of forming a specific class of oligomeric olefin monoamines that avoids the use of high-pressure and high-temperature reactions. The specific class of oligomeric olefin monoamines to which the present invention is directed are disclosed in Dever et al. U.S. Pat. No. 5,810,894. The disclosure of U.S. Pat. No. 5,810,894 is incorporated by reference herein in its entirety.

Oligomeric olefin monoamines that are produced by the methods of the present invention are useful as additives for fuels and oils. Fuels include, for example, gasoline or motor fuels, aviation fuels, marine fuels and diesel fuels. Oils include, for example, crankcase oils, transmission oils and gear oils.

In one preferred embodiment the method includes epoxidizing an oligomeric olefin to provide an epoxidized oligomeric olefin, converting the epoxidized oligomeric olefin to an aldehyde and then converting the aldehyde to an oxime, and then reducing the oxime to provide the oligomeric olefin monoamine.

In another preferred embodiment the method includes converting the aldehyde to a formamide intermediate and converting the formamide by hydrolysis to an amine.

In another preferred embodiment the method includes converting an epoxidized oligomeric olefin to an oxime, followed by reducing the oxime to provide the oligomeric olefin monoamine.

In another preferred embodiment the method includes converting an oligomeric olefin directly to an aldehyde, converting the aldehyde to an oxime and then reducing the oxime to provide the oligomeric olefin monoamine.

The oligomeric olefin utilized in the method of the present invention is preferably a reactive polybutene. A reactive polybutene for use in the present invention is an unsaturated polymer, wherein more than 50% of the double bonds are in the a position. One method of preparing such polybutenes is described in German Patent No. 2,702,604. Applicants hereby incorporate by reference the teachings of German Patent No. 2,702,604 and U.S. Pat. No. 4,832,702.

Commercial polybutene that contains a high level of terminal vinylidene unsaturation suitable for use in the present invention provides a material having the following chemical structure in its terminal monomer unit:

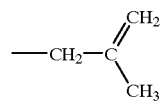

Additional end group structures may also be present in commercial polybutenes, but such end group structures are not preferred for use in the method of the present invention.

The average molecular weight of commercial polybutenes of interest in the present method is generally greater than about 400, preferably from about 400 to about 3,000, more preferably from about 600 to about 2,200 and most preferably from about 800 to about 1,600. Notwithstanding the foregoing ranges, it is understood that the practice of the present invention is possible with any commercially available reactive polybutene oligomers having any number average molecular weight between about 400 and 3,000, and having terminal unsaturation.

Typical useful polybutenes that are commercially available today include, for example, INDOPOL H-100HR®

(Mn 1000), Ultravis® 10 (Mn 950) or Ultravis® 30 (Mn 1300) all from BP Amoco Chemicals and Glissopal® ES 3250 (Mn 1000) from BASF.

The initial step in one embodiment of the method of the present invention is epoxidation of the unsaturation in the oligomeric olefin. Preferably, the epoxidation reaction occurs by reacting the oligomeric olefin with hydrogen peroxide in the presence of an organic carboxylic acid and a mineral acid catalyst. Due to the high viscosity of the starting oligomeric olefins, the epoxidation reaction is desirably carried out in a hydrocarbon solvent.

The amount of the hydrogen peroxide is generally from about 0.5 to about 2.5, and preferably from about 1.5 to about 2.0 moles per mole of olefin based upon the number average molecular weight of the olefin. The organic carboxylic acid is generally a monocarboxylic acid having a total of from 2 to 4 carbon atoms with acetic acid being preferred. The amount of the organic carboxylic acid is generally from about 0.15 to about 0.5 moles, and preferably from 0.25 to about 0.40 moles per mole of oligomeric olefin based upon the number average molecular weight of the olefin. In addition to this organic carboxylic acid, an acid catalyst is also required. The acid catalyst can be one or more organic acids, or one or more inorganic acids, or combinations thereof which are utilized to effect the epoxide reaction. Examples of specific acid catalysts include methanesulfonic acid, toluenesulfonic acid, sulfuric acid, phosphoric acid and the like and are utilized in small amounts as from about 0.0025 to about 0.40 moles per mole of the olefin based upon the number average molecular weight thereof.

The hydrocarbon solvent utilized in the epoxidation reaction can generally be any inert organic solvent, that is a solvent which does not enter into reaction with any of the reactants. Such solvents include aromatic solvents having a total of from about 6 to about 14 carbon atoms with specific examples including xylene, toluene, $C_{10}$, $C_9$, A100, A150 aromatics and the like, an aliphatic solvent having from about 6 to about 14 carbon atoms with specific examples including isooctane, heptane, cyclohexane and the like, or various aliphatic substituted aromatic compounds and the like, as well as combinations thereof.

The temperature of the epoxidation reaction will depend on the organic acid used and is a function of the stability of the intermediate peracid and the reaction rate thereof. For acetic acid, the reaction temperature is generally from about 60° C. to about 85° C., desirably from about 75° C. to about 85° C., and preferably from about 78° C. to 82° C. Suitable reaction temperatures for other organic carboxylic acid reactants will range according to the stability of the intermediate peracid and their reactivity. Some acids can be run at reaction temperatures as low as about 20° C. Inasmuch as the reaction is exothermic, it is generally necessary to cool the reaction after it has commenced to maintain the temperature within the above ranges. The reaction is generally conducted at atmospheric pressure, preferably under an inert atmosphere such as nitrogen.

The epoxide is a viscous, colorless to light yellow liquid which can be isolated by the removal of the solvent by a variety of conventional techniques such as vacuum stripping, wiped film evaporation and the like. The degree of epoxidation or conversion is generally about 90 percent. The resulting intermediate is used without further purification in the subsequent isomerization step.

It will be appreciated that epoxidation can be achieved by any of the methods employed in the conversion of olefins to epoxides, and the present invention is not limited to the above described technique. Also, it will be appreciated that various reagents can be used to effect epoxidation including, for example, t-butyl hydroperoxide, peracetic acid and m-chloroperbenzoic acid.

The epoxidation step yields a material with the following end group structure:

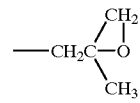

In a subsequent step of the process the epoxide is converted to an aldehyde by rearrangement or isomerization of the epoxide. Applicants hereby incorporate by reference the article of J. P. Kennedy et al. entitled "New Telechelic Polymers and Sequential Copolymers by Polyfunctional Initiator—Transfer Agents (Inifers)" for its teachings on the formation of aldehydes. The aldehyde exhibits the following structure:

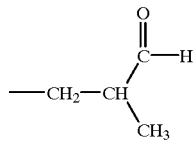

Alternatively, it will be appreciated that the aldehyde may be formed directly from the oligomeric olefin.

In one preferred embodiment the aldehyde is converted to an oxime. Preferably, the aldehyde is converted using hydroxyl amine formed by neutralizing an acid salt of hydroxyl amine. An acid salt of the hydroxyl amine is neutralized to form hydroxyl amine. The hydroxyl amine reacts with the aldehyde to form the oxime. The oxime is then reduced to the desired amine by catalytic reaction with hydrogen. This hydrogenation is performed at moderate temperatures and pressures (e.g., less than about 150° C. and less than about 200 psi) in the presence of a metal catalyst. Examples of suitable metal containing catalysts include Raney nickel, nickel on Kieselguhr, copper chromite, platinum oxide on carbon, Raney cobalt and palladium on carbon. The oxime exhibits the following structure:

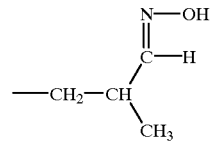

In another preferred embodiment the aldehyde is converted to a formamide. The formamide is formed using a Leuckart reaction. The Leuckart reaction is conducted using an appropriate reagent. Various reagents may be utilized including ammonium formate. The formamide is then converted to the desired amine by hydrolysis. Hydrolysis is preferably performed using hydrochloric acid at a moderately elevated temperature (less than 100° C.), and ambient pressure. Hydrolysis is promoted by the use of a phase transfer agent such as, for example, Aliquat 336 (tricaprylymethyl ammonium nitrate). The formamide exhibits the following structure:

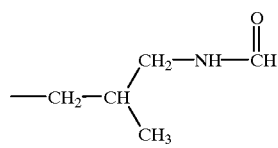

Irrespective of which route is employed (i.e., the oxime or the formamide), conversion to the amine yields a material with the following end group structure:

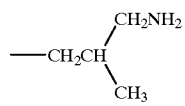

The oligomeric olefin monoamine final product that is generated by the process may be diluted with solvent(s), for example, $C_9$ aromatic solvent or toluene, to the desired percent basic nitrogen as is well-known in the art. Dilution facilitates mixing of the final product with the oil or fuel to which it is to be added. The final product can also be added to a carrier to facilitate its use. The final product of the present invention will generally be employed in a hydrocarbon distillate fuel boiling in the gasoline or diesel range, but use of the final product in other fuels such as aviation and marine fuel is also contemplated. Generally, a dilution of from about 50 ppm to about 2000 ppm additive in the fuel is desired.

In order to demonstrate practice of the present invention, the following illustrative examples are provided. The specific embodiments described below are intended to illustrate, but not to limit, the present invention.

EXAMPLE I

Epoxidation of Polyisobutylene

A 1.0 L flask was charged with 300 g of Ultravis 10 (BP Amoco polybutene) and 150 g of heptane. The material was stirred until solution was complete. The reactor was then charged with 7.94 g of glacial acetic acid, 0.97 g of 85% phosphoric acid and 0.7 g of 50% sulfuric acid. The mixture was then heated to 80° C. A constant feed addition funnel was charged with 42.9 g of 70% hydrogen peroxide. The peroxide was added dropwise to the reaction mixture over the period of one hour. The reaction was then stirred at 80° C. for an additional 6 hours. The reaction was then cooled to room temperature. The aqueous layer was separated and discarded. The organic layer was then washed twice with 300 ml of water. After the organic layer was washed to remove the acids from the product it was then dried and stripped of solvent to yield 303 g of epoxidized polybutene with an oxirane value of 1.27.

EXAMPLE II

Formation of Aldehyde from Epoxide

A 1000 ml round bottom flask was charged with 311.46 grams of Ultravis 10 epoxide prepared by the methods of Example I, 308.25 grams of xylenes and 35 grams of zinc bromide. This reaction mixture was stirred and heated to reflux for four hours. After the reaction was cooled to room temperature, the catalyst was removed from the reaction mixture by filtration. A sample of this solution was then stripped of solvent under a vacuum. The IR of this sample shows a carbonyl stretch at about 1730 $cm^{-1}$ which indicated a near quantitative conversion of the epoxide to the aldehyde when compared with standard material.

EXAMPLE III

Conversion of Aldehyde to Oxime

A 500 ml round bottom flask was charged with 212.2 grams of the aldehyde solution of Ultravis 10 aldehyde described in Example II. To this solution was added 21 grams of hydroxylamine hydrochloride dissolved in 50 ml of deionized water. This mixture was stirred to ensure intimate mixing. The hydrochloride was then neutralized by addition of 10.6 grams of sodium carbonate slurried in 50 ml of deionized water. After the addition of the carbonate solution was completed, the reaction mixture was heated to reflux for one hour. The solution was then cooled to room temperature and stirred at room temperature overnight. The next day aqueous layer was removed and the organic layer was washed twice with 50 ml of deionized water. The organic layer was dried by distilling off the water azeotrope with xylenes. A sample of the solution of the product was stripped of solvent under reduced pressure. The NMR and the IR indicated the formation of the oxime. Elemental analysis of this sample indicated that there was 0.8 percent nitrogen in the sample.

EXAMPLE IV

Reduction of Oxime to Form Amine

A 1 L Parr reactor was charged with 167.54 grams of the solution of the Ultravis 10 oxime described in Example III and 14.76 grams of Raney nickel. The reactor was closed, purged with nitrogen, evacuated and then filled with hydrogen. The reactor was pressurized with hydrogen to 85 psig and then heated to 150° C. The reaction mixture was then stirred at 150° C. for four hours. The reaction was then cooled to room temperature. The hydrogen was vented from the reactor. It was then opened and the catalyst was removed by filtration. The solvent was removed from the sample under a vacuum. The sample was analyzed by titration to have 0.75 percent basic nitrogen. Elemental analysis of this sample showed that it contained 0.62 percent nitrogen.

EXAMPLE V

Leuckart Reaction of Aldehyde Using Ammonium Formate

The aldehyde prepared as described in Example II was stripped of solvent. A 250 ml round bottom flask was charged with 48.38 grams of the stripped aldehyde and 5.077 grams of ammonium formate. The reaction was heated to 170–173° C. and it foamed and turned a dark amber color. After about 90 minutes the reaction reached 193° C. The reaction was then cooled to about 100° C. and 100 ml of A-100 solvent was added to the reaction. The reaction solution was then refluxed for four more hours. The reaction solution was then cooled to room temperature. The reaction solution was washed twice with 200 ml of deionized water to remove any ammonium formate left in the reaction mixture. The organic layer was then dried with anhydrous sodium sulfate and was stripped of solvent under a vacuum. The IR of the product showed three carbonyl stretches none of which correspond to the frequency in the starting aldehyde. Elemental analysis of the product was 0.52 percent nitrogen.

EXAMPLE VI

Leuckart Reaction of Aldehyde Using Formic Acid and Ammonium Hydroxide

A three neck reaction flask fitted with a Dean-Stark trap, condenser, heating mantle and a mechanical stirrer was charged with 214 grams of 28–30% ammonium hydroxide. An addition funnel was charged with 199.84 grams of 88% formic acid and this formic was slowly added with stirring to the ammonium hydroxide. The mixture was heated driving off the water which was collected in the trap. When the mixture reached 160° C., 201.92 grams of the aldehyde of Example II was dissolved in 100 ml of xylene all at once using an addition funnel. The xylene was distilled off and the reaction was heated to 170° C. for 20 hours. After the reaction, about 100 ml xylene was added to the reaction mixture which was then washed repeatedly with 200 ml portions water. The mixture was then dried by distilling off the water azeotrope with xylenes and the solvent was stripped off under vacuum. Elemental analysis of this sample revealed that it contained 0.55% nitrogen.

EXAMPLE VII

Hydrolysis of Formamide to Form Amine

The formamide from Example VI (34.16 g) was dissolved in 50 ml of xylenes and was transferred to a 250 ml three neck Morton flask equipped with a mechanical stirrer, heating mantle and condenser. Concentrated hydrochloric acid (50 ml) and Aliquat 336 (0.67 grams) (tricaprylymethyl ammonium nitrate) were added and the mixture was heated to 90° C. for 92 hours. The mixture was then washed three times with 100 ml water and once with 100 ml 10% NaOH. The organic phase was then stripped of solvents under vacuum. A sample of this product was analyzed by titration to have 0.37 percent basic nitrogen.

EXAMPLE VIII

Direct Synthesis of Aldehyde from Polybutene

A 1 L Morton flask was charged with 312.82 grams of Ultravis 10 polybutene and 160.88 grams of heptane. The mixture was stirred with a mechanical stirrer to complete the dissolution. The solution was then heated to 80° C. and 5.81 grams of glacial acetic acid was added to the reaction. To a constant addition funnel was weighed 0.25 grams of 85% phosphoric acid, 20.03 grams of 50% sulfuric acid and 36.5 g of 50% hydrogen peroxide. This hydrogen peroxide solution was added drop wise to the stirred reaction solution at 80° C. over a period of 2 hours. After the addition was complete the reaction mixture was stirred at 80° C. for an additional 13 hours. The reaction was then cooled to 60° C. and was washed three times with 200 grams of deionized water. The organic layer was then dried by distilling off the azeotrope of water using a Dean-Stark trap. A sample of the organic solution was then stripped of solvent and analyzed for the amount of carbonyl present by IR. The IR of this sample shows a carbonyl stretch at about 1730 cm$^{-1}$ and a conversion to the aldehyde of 88.35%.

EXAMPLE IX

Conversion of Aldehyde to Oxime

A 500 ml round bottom flask was charged with 51 grams of the polybutene aldehyde product of Example VIII. This material was dissolved in 102.3 grams of xylenes. Separately, 10.5 grams of hydroxylamine hydrochloride was dissolved in 40 grams of water. This solution was added to the round bottom flask containing the polybutene aldehyde. This mixture was stirred to ensure mixing of the two phases. A solution of 5.3 grams of sodium carbonate in 30 grams of water was slowly added to the reaction to free the hydroxyl amine. The reaction mixture was stirred at room temperature for 30 minutes and then was heated to reflux for one hour. The reaction mixture was then cooled to room temperature, and it was then transferred to a 1 L separatory funnel. The aqueous layer was separated and discarded. The organic layer was washed twice with 100 grams of deionized water. The organic layer was then dried and stripped on a rotary evaporator. The IR of the sample indicated that the oxime had been formed. Elemental analysis indicated that the product had 0.24 percent nitrogen.

EXAMPLE X

Epoxidation of Polyisobutlyene

A 1.0 L Morton flask was charged with 300 g of Amoco H100HR polyisobutylene and 150 g of xylenes. The reactor was then charged with 5.91 g of glacial acetic acid. Heat and a nitrogen blanket were then applied. An addition funnel was charged with 0.28 g of 50% sulfuric acid, 0.28 g of 85% phosphoric acid, and 39.90 g of 50% hydrogen peroxide. When the contents of the Morton flask reached 80C, the contents of the addition funnel were added over a two hour period. The reaction remained at this temperature under constant agitation for five hours prior to the end of the addition, for a total of seven hours. The reaction was cooled to room temperature and washed three times with 200 g of deionized water. The aqueous layer was discarded. The solvent was then removed under vacuum. Infared analysis indicated that the product is greater than 97% epoxidized.

EXAMPLE XI

Conversion of an Epoxide to an Oxime

A 1 L round bottom flask was charged with 202.0 grams of the epoxidized Amoco H100HR polybutene of Example X, 110.4 grams of xylenes and 0.41 grams of zinc bromide. This mixture was stirred and heated to reflux for two hours. The mixture was then cooled to 95° C. and a solution of 20.40 grams of hydroxylamine sulfate in 100 grams of water was added followed by a solution of 12.2 grams of sodium hydroxide in 50 grams of water. The resulting mixture was stirred and refluxed for two hours. The reaction mixture was then cooled to room temperature, and then transferred to a separatory funnel. The aqueous layer was separated and discarded. The organic layer was washed three times with deionized water. The organic layer was dried and the solvent was removed on a rotary evaporator. Analysis of the product by IR and NMR indicated the formation of the polybutene oxime. Elemental analysis indicated a product having a nitrogen level of 1.1 percent.

EXAMPLE XII

Conversion of an Epoxide to an Oxime

A 1 L round bottom flask was charged with 202.16 grams of the epoxidized Amoco H100HR polybutene of Example X, 100.9 grams of xylenes and 3.41 grams of zinc bromide. This mixture was stirred and heated to a temperature of 96° C. A solution of 20.48 grams of hydroxylamine sulfate in 100 grams of water was added followed by a solution of 11.43 grams of sodium hydroxide in 50 grams of water. The resulting mixture was stirred and refluxed for two hours. The reaction mixture was then cooled to room temperature, and then transferred to a separatory funnel. The aqueous layer was separated and discarded. The organic layer was washed three times with deionized water. The organic layer was dried and the solvent was removed on a rotary evaporator. Analysis of the product by IR and NMR indicated the formation of the polybutene oxime. Elemental analysis indicated a product having a nitrogen level of 0.94 percent.

EXAMPLE XIII

Conversion of an Epoxide to an Oxime

A 1 L round bottom flask was charged with 200.06 grams of the epoxidized BP Amoco H100HR polybutene, 105.70 grams of xylenes, 6.08 grams of zinc bromide and 20.77 grams of hydroxylamine sulfate. This mixture was stirred and heated to a temperature of 96° C. A solution of 20.30 grams of sodium hydroxide in 100 grams of water was added dropwise using an addition funnel over a period of 30 minutes. The resulting mixture was stirred and refluxed for an additional 1 hour and 30 minutes. The reaction mixture was then cooled to room temperature, and then transferred to a separatory funnel. The aqueous layer was separated and discarded. The organic layer was washed three times with deionized water. The organic layer was dried and the solvent was removed on a rotary evaporator. Analysis of the product by IR and NMR indicated the formation of the polybutene oxime. Elemental analysis indicated a product having a nitrogen level of 0.92 percent.

EXAMPLE XIV

Reduction of Oxime to Form Amine

A 1 L Parr reactor was charged with 200 grams of the polybutene oxime described in Example XII and 15.0 grams of Raney nickel and 100 grams of xylene. The reactor was closed, purged with nitrogen and pressurized to 150 psi with hydrogen. The reaction mixture was then heated to 150° C. and stirred at 1000 rpm for four hours. The reactor was then cooled to room temperature and the hydrogen was vented. The catalyst was removed from the reaction mixture by filtration. The solvent was then removed from the mixture using a rotary evaporator. Analysis of the product by IR and NMR indicated the formation of the polybutene monoamine. The product was analyzed by titration to have 0.94 percent basic nitrogen.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A method of forming an oligomeric olefin monoamine having the following end group structure:

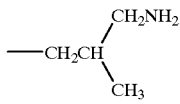

using temperatures of less than about 150° C. and pressures less than about 200 psi comprising forming an oligomeric olefin aldehyde, converting the oligomeric olefin aldehyde to the oligomeric olefin monoamine using temperatures of less than about 150° C. and pressures less than about 200 psi.

2. A method as set forth in claim 1 wherein said oligomeric olefin comprises an oligomeric olefin that displays terminal unsaturation in the monomer unit of the oligomeric olefin.

3. A method as set forth in claim 1 wherein said oligomeric olefin aldehyde is produced by first epoxidizing an oligomeric olefin to provide epoxidized oligomeric olefin and then converting the epoxidized oligomeric olefin to an oligomeric olefin aldehyde by isomerization.

4. A method as set forth in claim 1 wherein said oligomeric olefin aldehyde is produced by oxidizing an oligomeric olefin.

5. A method as set forth in claim 1 including the steps of converting the oligomeric olefin aldehyde to an oligomeric olefin formamide, and then converting the oligomeric olefin formamide to the oligomeric olefin monoamine.

6. A method as set forth in claim 3 wherein the epoxidized oligomeric olefin is produced by reacting the oligomeric olefin with hydrogen peroxide in the presence of an organic carboxylic acid and an acid catalyst.

7. A method as set forth in claim 3 including the steps of converting the oligomeric olefin aldehyde to an oligomeric olefin oxime, and then converting the oligomeric olefin oxime to the oligomeric olefin monoamine.

8. A method as set forth in claim 1 wherein said epoxidized oligomeric olefin is converted to an oligomeric olefin oxime.

9. A method as set forth in claim 8 wherein the oxime is converted to a the monoamine by catalytic hydrogenation.

10. A method as set forth in claim 8 wherein the hydrogenation is performed using a metal containing catalyst.

11. A method as set forth in claim 5 wherein the formamide is formed using a Leuckart reaction.

12. A method as set forth in claim 11 wherein said Leuckart reaction is performed using a formamide forming reagent.

13. A method of forming an oligomeric olefin monoamine comprising forming an oligomeric olefin aldehyde, converting the oligomeric olefin aldehyde to an oligomeric olefin oxime, and then converting the oligomeric olefin oxime to an oligomeric olefin monoamine.

14. A method of forming an oligomeric olefin monoamine comprising forming an oligomeric olefin aldehyde, converting the oligomeric olefin aldehyde to an oligomeric olefin formamide, and then converting the oligomeric olefin formamide to an oligomeric olefin monoamine.

15. An oligomeric olefin oxime having the following structure:

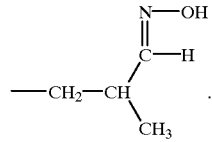

16. An oligomeric olefin formamide having the following structure:

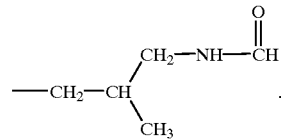

* * * * *